US005702518A

United States Patent [19]

Vogt et al.

[11] Patent Number: 5,702,518
[45] Date of Patent: Dec. 30, 1997

[54] GOLD PIGMENTS

[75] Inventors: Reiner Vogt, Darmstadt; Klaus Bernhard, Gross-Umstadt; Gerhard Pfaff, Münster, all of Germany

[73] Assignee: Merck Patent Gesellschaft mit ceschrankter Haftung, Darmstadt, Germany

[21] Appl. No.: 667,513

[22] Filed: Jun. 21, 1996

[30] Foreign Application Priority Data

Jun. 23, 1995 [DE] Germany ............ 195 22 864.2

[51] Int. Cl.$^6$ ............................................. C09C 1/36
[52] U.S. Cl. ............ 106/439; 106/31.65; 106/319; 106/403; 106/404; 106/415; 106/416; 106/417; 106/418; 106/437; 106/441; 106/442; 106/456; 106/459; 106/472; 106/474; 106/475; 106/486; 106/489; 428/403; 428/406
[58] Field of Search ........................ 106/403, 404, 106/415, 416, 417, 418, 437, 439, 441, 442, 456, 459, 472, 474, 475, 486, 489, 31.65, 31.9; 428/403, 406

[56] References Cited

U.S. PATENT DOCUMENTS

| | | | |
|---|---|---|---|
| 3,087,826 | 4/1963 | Chiola et al. | 106/286.26 |
| 3,711,308 | 1/1973 | Brand et al. | 106/417 |
| 3,874,890 | 4/1975 | Berhard et al. | 106/418 |
| 4,076,551 | 2/1978 | Bernhard et al. | 106/417 |
| 4,146,403 | 3/1979 | Armanini et al. | 106/418 |
| 4,744,832 | 5/1988 | Franz et al. | 106/418 |
| 5,009,711 | 4/1991 | Emmert et al. | 106/415 |
| 5,271,771 | 12/1993 | Franz et al. | 106/415 |
| 5,302,199 | 4/1994 | Prengel et al. | 106/415 |
| 5,322,561 | 6/1994 | Prengel et al. | 106/415 |
| 5,364,467 | 11/1994 | Schmid et al. | 106/404 |
| 5,501,731 | 3/1996 | Schmid et al. | 106/417 |
| 5,624,487 | 4/1997 | Schmidt et al. | 106/417 |
| 5,626,661 | 5/1997 | Schmid et al. | 106/417 |

OTHER PUBLICATIONS

Abstract of DE 41 41 069, Derwent AN 93–197949/25, Jun. 1993 (Equivalent to U.S. 5,626,661).

Primary Examiner—Mark L. Bell
Assistant Examiner—Scott L. Hertzog
Attorney, Agent, or Firm—Millen, White, Zelano, & Branigan, P.C.

[57] ABSTRACT

Gold pigments of high opacity and processes for their preparation and use.

9 Claims, No Drawings

GOLD PIGMENTS

The present invention relates to gold pigments of high opacity, to processes for their preparation and to their use.

BACKGROUND OF THE INVENTION

Pearl luster pigments based on mica platelets, whose gold tone is intensified by addition of iron oxides, have already been described on a multiplicity of occasions in the literature and have also been successively employed for many years. Pigments described in this context include both those in which iron oxide is precipitated onto the mica platelets together with another metal oxide, especially titanium dioxide, and those in which the precipitations are carried out in succession.

For instance, DE-C 14 67 488, CS 21 12 30 and CS 22 36 08 described pearl luster pigments for which an additional iron oxide layer was applied to mica platelets coated with titanium dioxide.

U.S. Pat. No. 3,087,826 discloses that the deposition of an $Fe_2O_3$ layer onto a $TiO_2$ layer produces gold-colored pigments which take on a reddish shade when calcined. DE-C 19 59 998 (U.S. Pat. No. 3,711,308) claims pigments which possess, on mica, first a coveting coat of titanium oxide and iron oxide and then a covering coat of titanium dioxide and/or zirconium dioxide.

DE-C 22 44 298 (U.S. Pat. No. 3,874,890) describes a process for the preparation of gold-colored pearl luster pigments in which a mica pigment coated with $TiO_2$ and $ZrO_2$ is first of all coated with iron(II) hydroxide which is then oxidized to $Fe_2O_3$.

DE-C 27 23 871 (U.S. Pat. No. 4,146,403) discloses mica pigments which, on a very thin $TiO_2$ layer or $Al_2O_3$ layer, carry a thick $Fe_2O_3$ layer.

Platelet-shaped substrates covered with a metal oxide layer of titanium and iron are described in EP 0 211 351 B1 (U.S. Pat. No. 4,744,832).

The gold pigments known from the prior art have the disadvantage that when viewed at flat angles, they show a brown tinge.

There was therefore a need for the preparation of gold pigments of high luster and opacity and without the requirement of great technical complexity, which do not have the disadvantages mentioned above.

It is known that by incorporating carbon into pigments it is possible to obtain special color effects. For instance, DE 41 41 069 (U.S. Pat. No. 5,626,661) describes luster pigments based on platelet-shaped silicatic substrates which are coated with a first layer comprising a highly refractive metal oxide, a second, black layer consisting essentially of carbon or metal, and a third, highly refractive metal-oxide layer.

SUMMARY OF THE INVENTION

It has surprisingly now been found that gold pigments with special color effects are obtained if substrates are covered first with a carbon-doped titanium dioxide layer and then with a layer of iron oxide.

The invention therefore provides gold pigments based on substrates coated with metal oxides, characterized in that the pigment possesses a multilayer structure in which a first layer of titanium dioxide, which is doped with carbon obtained by thermal decomposition of organic colloidal particles, is followed by an iron(III) oxide layer.

The invention also provides a process for the preparation of such gold pigments characterized in that an aqueous substrate solution is prepared, if desired a hydrolyzable metal salt solution and, simultaneously but separately, a titanium salt solution and an aqueous organic colloid solution are added, the pH of the substrate suspension being maintained, by simultaneous addition of a base or of an acid, in a range which brings about hydrolysis of the metal salt, the finished substrate is separated off, washed, dried and calcined at temperatures of >700° C. in the absence of oxygen, after calcining an iron oxide layer or iron hydroxide layer is precipitated onto the substrate, coated in this way, in aqueous solution, and the finished pigment is separated off, washed, dried, and, if desired, calcined.

Upon further study of the specification and appended claims, further objects and advantages of this invention will become apparent to those skilled in the art.

Suitable substrate bases for the coating are both opaque and transparent non-platelet-shaped substrates. Preferred substrates are phyllosilicates and platelet-shaped materials coated with metal oxides. Particularly suitable materials, are mica, talc, kaolin, bismuth oxychloride, flakes of glass, $BaSO_4$, $SiO_2$ or of synthetic ceramics, or other comparable materials. Also suitable are metal flakes, for example aluminum flakes or metal oxides in platelet form, for example iron oxide in platelet form and mica coated with colored or colorless metal oxides, alone or in a mixture in a single layer or in successive layers. These pigments, known as pearl luster pigments, are disclosed for example in the German patents and patent applications 14 67 468, 19 59 998, 20 09 566, 22 14 545, 22 15 191, 22 44 298 (U.S. Pat. No. 3,874,890), 23 13 331, 25 22 572, 31 37 808, 31 37 809, 31 51 343, 31 51 354, 31 51 355, 32 11 602 and 32 35 017.

The platelet-shaped substrates preferably have a thickness of from about 0.1 to 5 μm and, in particular, from about 0.2 to 4.5 μm. Their extent in the two other dimensions is preferably from about 1 to 250 μm, in particular from about 2 to 200 μm.

The gold pigments are prepared in two steps. First the substrate is covered with $TiO_2$ and the organic colloidal particles. After treatment by pyrolysis, coating with $Fe_2O_3$ takes place in the second step.

In order to prepare the pigments according to the invention, an aqueous suspension of the substrate is first prepared. A solution of at least one metal salt, for example $SnCl_4$, can be introduced into this suspension if desired. This is followed by the simultaneous but separate addition of the titanium salt solution and of the organic colloid solution, the pH of the reaction mixture being maintained, by simultaneous addition of an acid or base, within a range which brings about hydrolysis of the metal salt. In this process, the metal oxide mixture is precipitated together with the colloid particles onto the substrate surface.

After separation, washing and drying of the substrates coated in this way, the pigments are calcined at >700° C., preferably from about 800°–850° C., in the absence of oxygen, during which the decomposition of the organic colloid particles takes place. The calcination temperature depends in general on the thickness of the precipitated layer; the calcination period can be from several minutes to a number of hours, but preferably from 20 to 120 minutes.

The $TiO_2$-coated substrates are then suspended in water and coated with iron hydroxide or iron oxide by addition of an aqueous iron(III) salt solution. The coated pigment is separated off, washed, dried and, if desired, calcined at temperatures from about 100 to 300° C., preferably 150°–250° C. Preferred iron(III) salts include $FeCl_3$, $FeBr_3$, $Fe_2(SO_4)_3$ and $Fe(NO_3)_3$, particularly $FeCl_3$.

The metal salts can be precipitated using any acid or base. The optimum concentrations and pH values can be determined by routine experiments. It is customary for the pH established for precipitation to be maintained during the entire precipitation process, in order to obtain uniform pigments.

It is preferred to use as bases those which are easily obtainable industrially, for example NaOH, KOH or ammonia, and, as acids, dilute mineral acids, for example HCl, $H_2SO_4$ or $HNO_3$. Since the bases and acids serve only to alter the pH, their nature is not critical, and so other acids and bases can also be employed.

As metal salts from which the hydroxides can be precipitated, it is possible to use all water-soluble salts which are hydrolyzable by bases or acids.

Suitable metal salts are the halides, nitrates and sulfates, especially the chlorides, of titanium and iron.

The individual process parameters for the coating and for hydrolysis of the meal salts are of conventional type and are described in detail in, for example, DE 25 57 796 (U.S. Pat. No. 4,076,551). All further parameters, for example particle size, metal salt concentrations, temperatures and preferred embodiments, can likewise be found in DE 25 57 796 (U.S. Pat. No. 4,076,551). By varying the thickness of the doped titanium dioxide layer it is possible in the case of coated platelet-shaped substrates to obtain any desired first-order or higher-order interference colors. The thickness of the $TiO_2$ layer or $Fe_2O_3$ layer is not critical per se, and is in general from about 1 to 400 nm, preferably from 5 to 200 nm.

The $TiO_2$ layer is preferably in the rutile modification. This can be achieved in accordance with prior art processes by incorporating foreign ions, especially tin(IV), into the layer. These processes are described, for example, in DE-C 22 14 545 and 25 22 572.

If desired, the gold pigments according to the invention can also be aftercoated.

An essential component of the covering composition comprises the organic colloid particles. All known organic colloids having particle dimensions $<10^{-5}$ cm can be used. The particle dimensions are preferably from 1–1000 nm. Preference is given to the use of colloidal organic particles which are readily soluble in water, such as polysaccharides, starch, cellulose, dextrin or gelatin and derivatives thereof. The proportion of colloid particles on the substrate surface before calcination is from 0.01 to 20% by weight, preferably from 0.1 to 10% by weight, based on the total pigment.

On pyrolysis under inert conditions, the calcination step, the colloid breaks down in the metal oxide layer to give an extremely finely divided carbon with dimensions <5 nm. The carbon is distributed uniformly in the titanium dioxide layer. Interstices between the metal oxides are filled, resulting in an extremely compact carbon-metal oxide layer of high opacity.

The content of carbon in the titanium dioxide layer can be controlled by the quantity of colloidal particles which are applied to the substrate surface together with the titanium dioxide.

The proportion of carbon in the pigments according to the invention is preferably from about 0.01 to 10% by weight, more preferably from 0.1 to 5% by weight, and, in particular, from 0.1 to 1% by weight, based on the total pigment.

Because of the different substrates, the proportion by weight of carbon in the titanium dioxide layer may vary very greatly. As the carbon content goes up, the pigment takes on an increasingly graphite-like luster.

Bleeding of the carbon by organic solvents is not observed. Furthermore, the pigments according to the invention are notable for increased gloss and also for their high opacity. In addition to this, the pigments are weather-stable and non-conductive.

The gold pigments prepared in accordance with the invention are abrasion-resistant, very opaque and readily dispersible, so that they can be employed for a variety of applications, especially for automotive finishes, for printing inks and in cosmetics.

The invention therefore additionally provides for the use of the gold pigments in formulations such as paints, varnishes, powder coatings, printing inks, plastics and cosmetics.

The invention additionally provides formulations comprising the gold pigments according to the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application 195 22 864.2, filed Jun. 23, 1995, are hereby incorporated by reference.

EXAMPLES

The examples which follow are intended to illustrate the invention in more detail but without limiting it:

Example 1

100 g of mica with a particle size of 10–60 μm are suspended in 2 l of water and the suspension is heated to 75° C. A solution consisting of 2.3 g of $SnCl_4 \times 5H_2O$ and 10 ml of 37% HCl in 40 ml of water is metered into the mica suspension. When the addition of the $SnCl_4$ solution is complete, 220 ml of $TiCl_4$ solution (400 g $TiCl_4$/water) and the gelatin solution (4 g dissolved in 220 ml of water) are metered simultaneously but separately into the pigment suspension. The pH is adjusted to 6.0 using 32% NaOH solution. The mixture is then stirred for 15 minutes. Finally, the finished pigment is filtered off, washed free from salt, dried at 100° C. and calcined at 850° C. for 0.5 h in a nitrogen atmosphere.

100 g of the mica pigment coated in this way are suspended in 2 l of water and the suspension is heated to 75° C. During the metered addition of 650 ml of $FeCl_3$ solution (5 g of $FeCl_3$/100 ml of water) the pH is kept constant at 4 by addition of 32% NaOH solution. When the covering operation is over, stirring is continued at 75° C. for 15 minutes. The pigment is filtered off, washed free from salt and dried at 200° C. for 10 h. A pigment having a golden interference color and a grey mass tone is obtained.

Example 2

100 g of mica with a particle size of 10–60 μm are suspended in 2 l of water and the suspension is heated to 75° C. A solution consisting of 2.3 g of $SnCl_4 \times 5H_2O$ and 10 ml of 37% HCl in 40 ml of water is metered into the mica suspension. When the addition of the $SnCl_4$ solution is complete, 320 ml of TiCl$_4$ solution (400 g TiCl$_4$/water) and the gelatin solution (4 g dissolved in 320 ml of water) are metered simultaneously but separately into the pigment suspension. The pH is adjusted to 6.0 using 32% NaOH solution. The mixture is then stirred for 15 minutes. Finally, the finished pigment is filtered off, washed free from salt, dried at 100° C. and calcined at 850° C. for 0.5 h in a nitrogen atmosphere.

100 g of the mica pigment coated in this way are suspended in 2 l of water and the suspension is heated to 75° C. During the metered addition of 300 ml of FeCl$_3$ solution (5 g FeCl$_3$/100 ml of water) the pH is kept constant at 4 by addition of 32% NaOH solution. When the covering operation is over, stirring is continued at 75° C. for 15 minutes. The pigment is filtered off, washed free from salt and dried at 200° C. for 10 h. A pigment having a golden interference color and a grey mass tone is obtained.

Example 3

100 g of mica with a particle size of 10–60 µm are suspended in 2 l of water and the suspension is heated to 75° C. A solution consisting of 2.3 g of SnCl$_4$×5H$_2$O and 10 ml of 37% HCl in 40 ml of water is metered into the mica suspension. When the addition of the SnCl$_4$ solution is complete, 400 ml of TiCl$_4$ solution (400 g TiCl$_4$/water) and the gelatin solution (4 g dissolved in 400 ml of water) are metered simultaneously but separately into the pigment suspension. The pH is adjusted to 6.0 using 32% NaOH solution. The mixture is then stirred for 15 minutes. Finally, the finished pigment is filtered off, washed free from salt, dried at 100° C. and calcined at 850° C. for 0.5 h in a nitrogen atmosphere.

100 g of the mica pigment coated in this way are suspended in 2 l of water and the suspension is heated to 75° C. During the metered addition of 170 ml of FeCl$_3$ solution (5 g FeCl$_3$/100 ml of water) the pH is kept constant at 4 by addition of 32% NaOH solution. When the covering operation is over, stirring is continued at 75° C. for 15 minutes. The pigment is filtered off, washed free from salt and dried at 200° C. for 10 h. A pigment having a golden interference color and a grey mass tone is obtained.

Comparison Example 1

100 g of mica with a particle size of 10–60 µm are suspended in 2 l of water, the suspension is heated to 75° C., and 1550 ml of FeCl$_3$ solution (5 g of Fe in 100 ml of water) are added. The pH is kept constant at 4 by addition of 32% NaOH solution. After the end of addition, the pigment suspension is stirred at 75° C. for 15 minutes. The coated mica pigment is filtered off, washed free from salt and dried at 200° C. for 10 h.

An interference pigment of brassy gold color with a brown mass tone is obtained.

Comparison Example 2

100 g of mica with a particle size of 10–60 µm are suspended in 2 l of water and the suspension is heated to 75° C. A solution consisting of 2.3 g of SnCl$_4$×5H$_2$O and 10 ml of 37% HCl in 40 ml of water is metered into the mica suspension. The pH is maintained constant at 4 during the addition with 32% NaOH solution. When the addition of the SnCl$_4$ solution is complete, 500 ml of TiCl$_4$ solution (400 g TiCl$_4$/water) and the gelatin solution (4 g dissolved in 500 ml of water) are metered simultaneously but separately into the pigment suspension. The pH is adjusted to 6.0 using 32% NaOH solution and the mixture is then stirred for 15 minutes. Finally, the finished pigment is filtered off, washed free from salt and calcined at 850° C. for 0.5 h in a nitrogen atmosphere.

A pigment with a yellow interference color and a grey mass tone is obtained.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A gold pigment comprising a substrate with multiple layers thereon, including a layer of titanium dioxide which is doped with carbon obtained by thermal decomposition of organic colloidal particles and an iron(III) oxide layer on the doped titanium dioxide layer.

2. A gold pigment according to claim 1, wherein the substrate is a platelet-shaped substrate.

3. A gold pigment according to claim 2, wherein the platelet-shaped substrate is a mica platelet, a flake of glass, BaSO$_4$, SiO$_2$ or synthetic ceramic, or a mica platelet coated with one or more metal oxides.

4. A gold pigment according to claim 1, wherein the colloidal organic particles are starch, cellulose, gelatin or dextrine particles.

5. A gold pigment according to claim 1, wherein the titanium dioxide layer is in the rutile modification.

6. A gold pigment according to claim 1, wherein carbon is uniformly dispersed in the titanium dioxide layer in particles of less than 5 nm.

7. A process for the preparation of a gold pigment according to claim 1 comprising:

simultaneously but separately adding a titanium salt solution and an aqueous organic colloid solution to an aqueous substrate solution, maintaining the pH of the substrate suspension by simultaneous addition of a base or of an acid in a range which brings about hydrolysis of the metal salt, separating a resulting substrate, and washing, drying and calcining the resulting substrate at a temperature of >700° C. in the absence of oxygen, after calcining, precipitating an iron oxide layer or hydroxide layer onto the substrate in aqueous solution, and separating the finished pigment, which is optionally washed, dried and/or calcined.

8. The process of claim 7, further comprising adding a hydrolyzable metal salt solution to the aqueous substrate solution.

9. A paint, varnish, powder coating, printing ink, plastic or cosmetic composition comprising a pigment according to claim 1 and at least one conventional auxiliary for such composition.

* * * * *